United States Patent
Wang et al.

(10) Patent No.: US 12,093,833 B2
(45) Date of Patent: Sep. 17, 2024

(54) VISUALIZATION METHOD FOR EVALUATING BRAIN ADDICTION TRAITS, APPARATUS, AND MEDIUM

(71) Applicant: Shenzhen Institutes of Advanced Technology, Guangdong (CN)

(72) Inventors: Shuqiang Wang, Guangdong (CN); Wen Yu, Guangdong (CN); Chenchen Xiao, Guangdong (CN); Shengye Hu, Guangdong (CN)

(73) Assignee: Shenzhen Institutes of Advanced Technology, Guangdong (CN)

( * ) Notice: Subject to any disclaimer, the term of this patent is extended or adjusted under 35 U.S.C. 154(b) by 395 days.

(21) Appl. No.: 17/549,258

(22) Filed: Dec. 13, 2021

(65) Prior Publication Data

US 2022/0101527 A1 Mar. 31, 2022

Related U.S. Application Data

(63) Continuation of application No. PCT/CN2020/078694, filed on Mar. 11, 2020.

(51) Int. Cl.
*G06V 10/32* (2022.01)
*G06N 3/088* (2023.01)
(Continued)

(52) U.S. Cl.
CPC ........... *G06N 3/088* (2013.01); *G06T 7/0012* (2013.01); *G06V 10/267* (2022.01); *G06V 10/32* (2022.01);
(Continued)

(58) Field of Classification Search
None
See application file for complete search history.

(56) References Cited

U.S. PATENT DOCUMENTS 9,275,457 B1* 3/2016 Chen .................. G06T 7/0016
2006/0036152 A1* 2/2006 Kozel .................... A61B 5/372
600/410
(Continued)

FOREIGN PATENT DOCUMENTS

CN 106250707 A 12/2016
CN 109697718 A 4/2019
(Continued)

OTHER PUBLICATIONS

A. Zhang. "Masked Smoking-Related Images Modulate Brain Activity in Smokers" Human Brain Mapping, 30:896-907. (Year: 2019).*
(Continued)

*Primary Examiner* — Oneal R Mistry
(74) *Attorney, Agent, or Firm* — IP Spring

(57) ABSTRACT

A visualization method for evaluating brain addiction traits, an apparatus, and a computer-readable storage medium are provided. The method includes the following. A visualization processing request is received from a client, where the visual processing request contains an image to-be-processed. The image to-be-processed is masked to obtain a perturbation image masked. The perturbation image is classified with a visualization processing model to obtain a classification result, and the classification result is calculated to obtain an evaluation value of the perturbation image, where the evaluation value of the perturbation image is less than an evaluation value of the image to-be-processed without masking. The visualization evaluation result is determined according to the evaluation value of the perturbation image. The visualization evaluation result is sent to the client.

20 Claims, 6 Drawing Sheets

(51) Int. Cl.
  *G06T 7/00* (2017.01)
  *G06V 10/26* (2022.01)
  *G06V 10/34* (2022.01)
  *G06V 10/764* (2022.01)
  *G06V 10/774* (2022.01)
  *G06V 10/82* (2022.01)

(52) U.S. Cl.
  CPC ............ *G06V 10/34* (2022.01); *G06V 10/764* (2022.01); *G06V 10/774* (2022.01); *G06V 10/82* (2022.01); *G06T 2207/10088* (2013.01); *G06T 2207/20081* (2013.01); *G06T 2207/20084* (2013.01); *G06T 2207/30016* (2013.01)

(56) References Cited

U.S. PATENT DOCUMENTS

| | | | | |
|---|---|---|---|---|
| 2009/0124886 | A1* | 5/2009 | Wang | A61B 5/055 600/407 |
| 2014/0073905 | A1* | 3/2014 | Jordan | A61B 5/16 600/410 |
| 2019/0046068 | A1 | 2/2019 | Ceccaldi et al. | |
| 2019/0228547 | A1 | 7/2019 | Chandarana et al. | |
| 2020/0288980 | A1* | 9/2020 | Stern | G16H 50/70 |
| 2020/0372309 | A1* | 11/2020 | Ratner | G06N 20/00 |
| 2021/0162216 | A1* | 6/2021 | Rezai | A61N 1/3615 |
| 2021/0166094 | A1* | 6/2021 | Sato | G06N 3/045 |
| 2021/0174497 | A1* | 6/2021 | Yoo | G06F 18/24 |

FOREIGN PATENT DOCUMENTS

| | | |
|---|---|---|
| CN | 110070935 A | 7/2019 |
| CN | 110443798 A | 11/2019 |
| CN | 110503187 A | 11/2019 |
| CN | 110503654 A | 11/2019 |
| CN | 110580695 A | 12/2019 |
| CN | 110610488 A | 12/2019 |
| CN | 111383217 A | 7/2020 |

OTHER PUBLICATIONS

Mete, Mutlu et al., "Successful classification of cocaine dependence using brain imaging: a generalizable machine learning approach", BMC Bioinformatics, Biomed Central Ltd, London, UK, vol. 17, No. 13, Oct. 6, 2016, pp. 49-61.

Yao, Qi, et al., "Brain Functional Connectivity Augmentation Method for Mental Disease Classification with Generative Adversarial Network", Computer Vision—ECCV 2020 :16th European Conference, Glasgow, UK, Aug. 23-28, 2020 : Proceedings; [Lecture Notes in Computer Science; ISSN 0302-9743], Springer International Publishing, Cham, Oct. 31, 2019, pp. 444-455.

Wang, Shui-Hua et al., "Alcoholism Detection by Data Augmentation and Convolutional Neural Network with Stochastic Pooling", Journal of Medical Systems, Springer US, New York, vol. 42, No. 1; Nov. 17, 2017, pp. 1-11.

Santos, Jeferson S. et al., "Classification of Cocaine Dependents from fMRI Data Using Cluster-Based Stratification and Deep Learning", Advances in Biometrics : International Conference, ICB 2007,Seoul, Korea, Aug. 27-29, 2007; Proceedings; [Lecture Notes in Computer Science; Lect.Notes Computer], Springer, Berlin, Heidelberg, Jul. 6, 2017, pp. 298-313.

Honorio, Jean et al., "Can a Single Brain Region Predict a Disorder?", IEEE Transactions on Medical Imaging, IEEE, USA, vol. 31, No. 11, Nov. 2012, pp. 2062-2072.

EPO, Extended European Search Report for European Patent Application No. 20924905.1, Jun. 20, 2022, 11 pages.

CNIPA, First Office Action for Chinese Patent Application No. 202010164199.7, Mar. 4, 2023, 17 pages.

CNIPA, International Search Report for International Patent Application No. PCT/CN2020/078694, Feb. 5, 2021, 4 pages.

Zeiler, Matthew D. et al., "Visualizing and Understanding Convolutional Networks," In: "SAT 201518th International Conference, Austin, TX, USA, Sep. 24-27, 2015," Jan. 1, 2014 (Jan. 1, 2014), Springer, Berlin, Heidelberg 032548, XP055228792, ISBN:3540745491 vol. 8689, pp. 818-833, DOI:10.1007/978-3-319-10590-1_53.

Esmaeilzadeh, Soheil et al., "End-to-End Parkinson Disease Diagnosis using Brain MR-Images by 3D-CNN," arxiv.org, Cornell University Library, 201 Olinlibrary Cornell University Ithaca, NY 14853, Jun. 13, 2018 (Jun. 13, 2018), XP080890442, 7 pages.

Yadav, Chhavi et al., "Using Brain MRI Images to Predict Memory, BMI& Age," 2019 IEEE International Conference on Humanizedcomputing and Communication (HCC), IEEE, Sep. 25, 2019 (Sep. 25, 2019), pp. 126-128, XP033680138, DOI:10.1109/HCC46620.2019.00026 [retrieved on Dec. 23, 2019].

Islam, Jyoti et al., "Understanding 3D CNN Behavior for Alzheimer's Disease Diagnosis from Brain PET Scan," arxiv.org, Cornell University Library, 201 Olinlibrary Cornell University Ithaca, NY 14853, Dec. 10, 2019 (Dec. 10, 2019), XP081548718, 5 pages.

EPO, Communication Pursuant to Article 94(3)EPC for corresponding European Patent Application No. 20924905.1, Apr. 24, 2024, 9 pages.

* cited by examiner

VISUALIZATION METHOD FOR EVALUATING BRAIN ADDICTION TRAITS, APPARATUS, AND MEDIUM

CROSS-REFERENCE TO RELATED APPLICATION(S)

This application is a continuation under 35 U.S.C. § 120 of International Application No. PCT/CN2020/078694, filed on Mar. 11, 2020, the entire disclosure of which is hereby incorporated by reference.

TECHNICAL FIELD

This disclosure relates to the technical field of big data, and in particular to a visualization method for evaluating brain addiction traits, an apparatus, and a medium.

BACKGROUND

Functional magnetic resonance imaging (FMRI) is a neuroimaging method that can accurately locate specific active cerebral cortex regions and capture changes in blood oxygen that can reflect neuronal activity. Combining FMRI with deep learning technology can extract complex features from original data, but the feature extraction method is poor in interpretability and requires a large number of FMRI images as a basis. Due to the complexity of the FMRI image acquisition process and the high experimental cost, FMRI images are difficult to be obtained, which in turn limits the research of deep learning methods in the field of FMRI image evaluation and visualization.

SUMMARY

In a first aspect, the implementations of the disclosure provide a visualization method for evaluating brain addiction traits. The method includes the following.

A visualization processing request is received from a client, where the visual processing request contains an image to-be-processed and is used for requesting a visualization evaluation result of the image to-be-processed. The image to-be-processed is masked to obtain a perturbation image masked. The perturbation image is classified with a visualization processing model to obtain a classification result, and the classification result is calculated to obtain an evaluation value of the perturbation image, where the evaluation value of the perturbation image is less than an evaluation value of the image to-be-processed without masking. The visualization evaluation result is determined according to the evaluation value of the perturbation image. The visualization evaluation result is sent to the client.

In a second aspect, the implementations of the disclosure provide a visualization processing apparatus for evaluating brain addiction traits. The visualization processing apparatus includes a transceiving unit and a processing unit.

The transceiving unit is configured to receive a visualization processing request from a client, where the visualization processing request contains an image to-be-processed and is used for requesting a visualization evaluation result of the image to-be-processed.

The processing unit is configured to mask the image to-be-processed to obtain a perturbation image masked, classify the perturbation image with a visualization processing model to obtain a classification result, and calculate the classification result to determine the visualization evaluation result.

The transceiving unit is further configured to send the visualization evaluation result to the client.

In a third aspect, the implementations of the disclosure provide a visualization processing apparatus for evaluating brain addiction traits. The visualization processing apparatus includes a processor, a memory, and a communication interface connected with each other. The memory is configured to store a computer program comprising program instructions. The processor is configured to invoke the program instructions to carry out the method as described in the first aspect. For the implementation manner and beneficial effects of the processing apparatus to solve the problem, reference may be made to the method and beneficial effects described in the first aspect above, which will not be repeated herein.

In a fourth aspect, the implementations of the disclosure provide a computer-readable storage medium. The computer-readable storage medium stores one or more first instructions which are adapted to be loaded by a processor to carry out the method described in the first aspect.

BRIEF DESCRIPTION OF THE DRAWINGS

In order to more clearly describe technical solutions in the implementations of the disclosure, the following will briefly introduce the drawings that need to be used in the implementations. Obviously, the drawings in the following description are only some implementations of the disclosure. For those of ordinary skill in the art, other drawings can be obtained based on these drawings without creative work.

DETAILED DESCRIPTION

Figure 1:
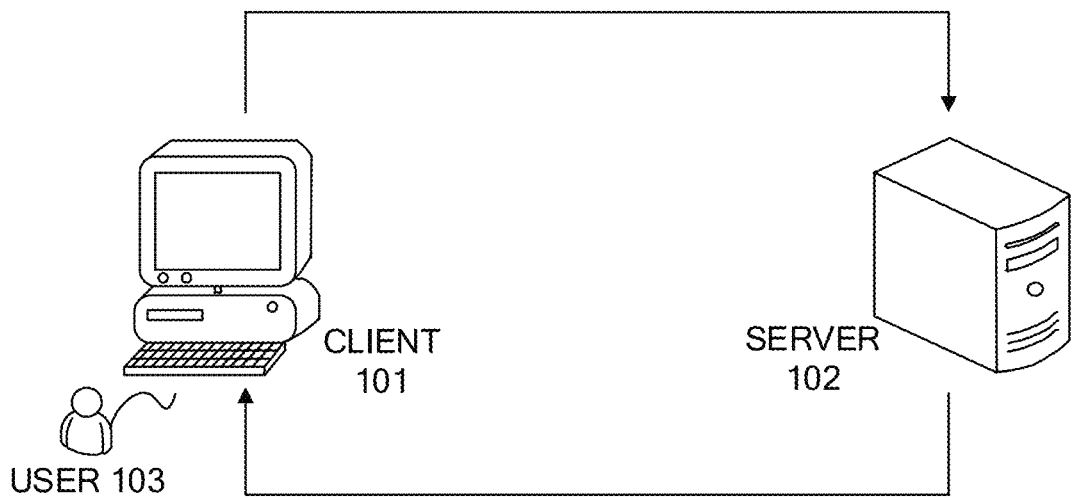
FIG. 1 is an architecture diagram illustrating a visualization system for evaluating brain addiction traits provided in implementations of the disclosure.

In order to make the purpose, technical solutions, and advantages of the disclosure clearer, the technical solutions of the implementations of the disclosure will be described below with reference to the accompanying drawings.

In order to clearly describe the solutions of the implementations of the disclosure, the technical solutions in the implementations of the disclosure will be described clearly and completely in conjunction with the drawings in the implementations of the disclosure. Obviously, the described implementations are a part rather than all of the implementations of the disclosure. Based on the implementations of the disclosure, all other implementations obtained by those of ordinary skill in the art without creative work shall fall within the protection scope of this disclosure.

The terms "first", "second", "third", etc. in the specification, claims, and the above-mentioned drawings of the disclosure are used to distinguish different objects, rather than to describe a specific sequence. In addition, the term "including" and any variations thereof are intended to cover non-exclusive inclusion. For example, a process, method, system, product, or device that includes a series of steps or modules is not limited to the listed steps or modules, but optionally includes steps or modules that are not listed, or optionally also includes other steps or modules inherent to these process, method, product or device.

As a non-invasive technology, FMRI can accurately locate specific active cerebral cortex regions and capture changes in blood oxygen that reflect neuronal activity. The combination of FMRI technology and machine learning technology has a broader application prospect in the field of biomedicine. This disclosure takes evaluation of nicotine addiction traits in the rat brain as an example. At present, the use of machine learning to study relevant characteristics of brain nicotine addiction requires a large number of FMRI images as the basis for model training. FMRI images can be seen as a time series composed of hundreds of three-dimensional brain anatomical structure images, that is, fourth-order images, which contain more than 100,000 different voxels. However, acquisition of FMRI images requires a complicated process, expensive instruments, high experiment cost, and a long time, which makes it difficult to acquire the FMRI images, so that the basic sample data for the experiment is insufficient. On the other hand, the process and results of machine learning has poor interpretability, which cannot intuitively, accurately and visually present the evaluation results of brain nicotine addiction traits.

In order to solve the above problem, the implementations of the disclosure provide a visualization method for evaluating brain addiction traits. The image processing method designs a semi-supervised ternary generative adversarial network with an independent classifier, which includes a generator network, a discriminator network, and a classifier network. By constructing a trait evaluation model of rat brain nicotine addiction with the ternary generative adversarial network, realistic FMRI images can be generated from random noise, and visualization evaluation results can be generated by means of the masking method. In this way, the nicotine addiction brain region can be located intuitively and accurately while reducing the number of FMRI image samples required.

In this technical solution, the client sends the visualization processing request containing the image to-be-processed to a server. The server performs masking on the image to-be-processed to obtain the masked perturbation image. The perturbation image is classified with the trained visualization procession model to obtain the classification result. The classification result is subjected to weighted calculation to obtain the evaluation value of the perturbation image, where the evaluation value of the perturbation image is less than the evaluation value of the image to-be-processed without masking. The evaluation value is used to determine whether a masking region is a key region that affects the classification result. According to the evaluation value of the perturbation image, the visualization evaluation result is determined. The visualization evaluation result is the key region that affects the classification result. The visualization evaluation result is sent to the client. With this method, the nicotine addiction activation region can be accurately located without a large number of FMRI images as basic samples, so that visualization of the evaluation result can be achieved.

In the implementations of the disclosure, the client sends the visualization processing request containing the image to-be-processed to the server. According to the visualization processing request, the server performs masking on the image to-be-processed to obtain the masked perturbation image. Masking the image to-be-processed may involve comparing different regions so as to obtain the key region that can affect the classification result. The perturbation image is classified with the trained visualization procession model to obtain the classification result. The classification result is subjected to weighted calculation to obtain the evaluation value of the perturbation image. The evaluation value may be used to determine whether the masking region is the key region that affects the classification result. The evaluation value of the perturbation image is less than the evaluation value of the image to-be-processed without masking. According to the evaluation value of the perturbation image, the visualization evaluation result is determined. The visualization evaluation result is the key region that affects the classification result. The visualization evaluation result is sent to the client. The visualization procession model may be trained as follows. A semi-supervised ternary generative adversarial network with an independent classifier is used to iteratively train at least one set of input sample images, so that the generator generates an image closer to the real FMRI image, and the classifier extracts more discriminative features related to nicotine addiction traits. With the method of the implementations, a random noise vectors can be converted into an accurate FMRI image without a large number of FMRI images as basic samples, which solves the problem of difficulty in obtaining FMRI images and saves the experiment cost. In addition, model training can enable the classifier to extract more discriminative features related to nicotine addiction traits, and obtain more accurate classification results, which can more intuitively and accurately locate the nicotine addiction brain region, and realize the visualization of the evaluation result.

Specifically, masking can be performed on a real FMRI image or an FMRI image generated by the generator. The masking may include the following. A random region or a specific region in the image can be shielded with a mask, so that the shielded region will not be calculated. The masked real FMRI image or the masked FMRI image generated by the generator is classified by the classifier in a trained visualization processing model, and calculation is performed on the classification result. According to the calculation result, whether the shielded region affects the classification result is determined. If the shielded region affects the classification result, the shielded region is determined to be a nicotine addiction activation region. Otherwise, the shielded region is determined to be a non-nicotine addiction activation region.

Optionally, this implementation can also be applied to other fields, such as: visualization tasks for assisted diagnosis of other diseases based on medical images, visualization of critical lesion areas that have a great impact on the results of disease diagnosis, and so on, which are not limited herein.

The above-mentioned visualization method for evaluating brain addiction traits can be applied to a visualization system for evaluating brain addiction traits as illustrated in FIG. 1. The visualization system for evaluating brain addiction traits includes a client 101 and a server 102. The type and quantity of the client 101 are used as an example, and do not constitute a limitation to the implementations of the disclosure. For example, there may be two clients 101.

The client 101 may be a client sending a visualization processing request to the server 102, a client providing a first sample image, a second sample image-annotation pair, a noise vector, and a vector annotation to the server 102 when the image processing model is trained, or a client connected with an FMRI device. The client may include any of the following: a terminal, a standalone application, an application programming interface (API), or a software development kit (SDK). The terminal may include but is not limited to a smart phone (such as an Android phone, an IOS phone, etc.), a tablet computer, a portable personal computer, a mobile internet device (MID), etc. which is not limited in the implementations of the disclosure. The server 102 may include but is not limited to a cluster server.

In the implementations of the disclosure, the client 101 sends the visualization processing request to the server 102. According to an image to-be-processed contained in the visualization processing request, the server 102 obtains a visualization evaluation result of the image to-be-processed. Specifically, the image to-be-processed is masked to obtain a perturbation image masked. The perturbation image is classified with a pre-trained visualization processing model to obtain a classification result, and the classification result is calculated to determine the visualization evaluation result. The visualization evaluation result is sent to the client 101 so that a user 103 of the client 101 can accurately locate the nicotine addiction brain region according to the visualization evaluation result.

Figure 2:
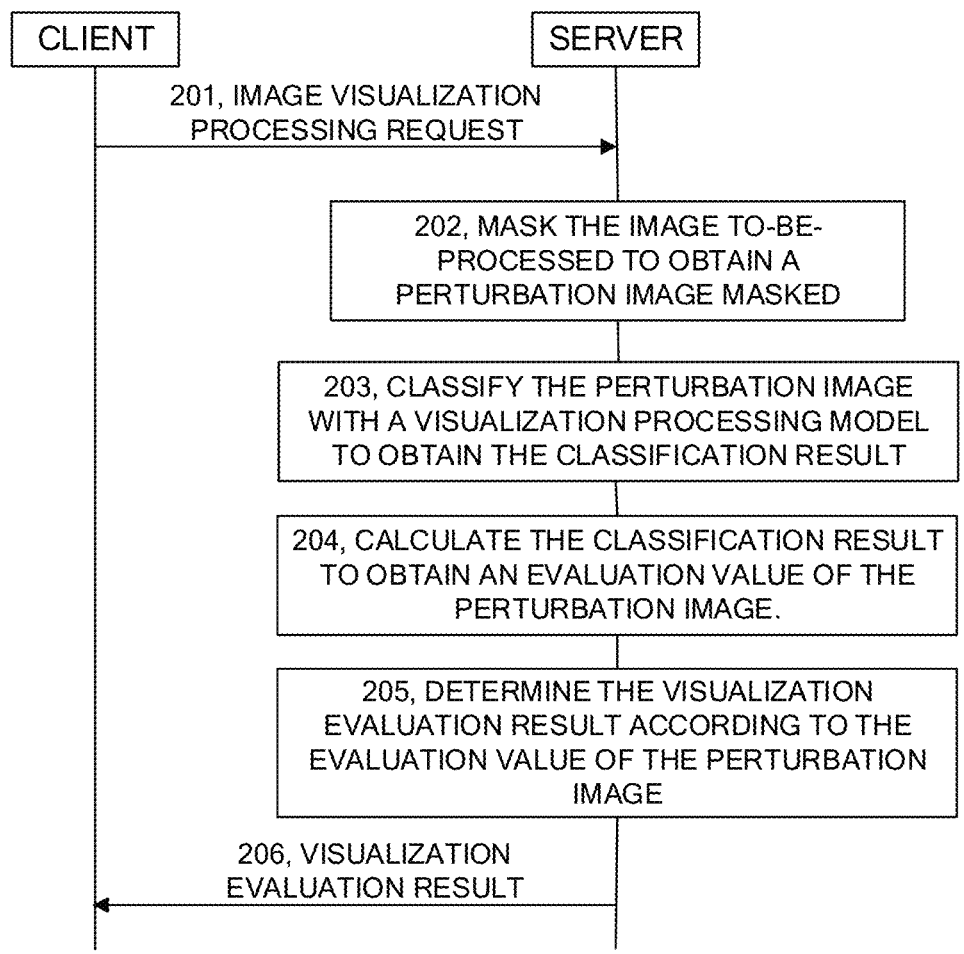
FIG. 2 is a flow chart illustrating a visualization method for evaluating brain addiction traits provided in implementations of the disclosure.

Referring to FIG. 2, FIG. 2 is a flow chart illustrating a visualization method for evaluating brain addiction traits provided in implementations of the disclosure. As illustrated in FIG. 2, the image processing method includes operations at 201 to 206.

At 201, the client 101 sends a visualization processing request to a server 102.

Specifically, the client 101 sends the visualization processing request to the server 102, and accordingly the server 102 receives the visualization processing request from the client 101. The visualization processing request contains an image to-be-processed and is used for requesting a visualization evaluation result of the image to-be-processed. The image to-be-processed may be an FMRI image corresponding to a rat brain injected with different concentrations of nicotine. Specifically, the FMRI image may be a real FMRI image or an FMRI image generated by a trained and optimized generator. Further, if the FMRI image is the real FMRI image, the server 102 may perform normalization on the image to-be-processed. The voxels of the normalized image to-be-processed have values ranged in [−1, 1].

At 202, the server 102 masks the image to-be-processed to obtain a perturbation image masked.

Specifically, the server 102 performs masking on a specified region or a random region in the image to-be-processed, to obtain the perturbation image masked. The masking can be understood as shielding the specified region or the random region in the image to-be-processed with a mask, so that the region will not be involved in processing or calculation of parameters.

Further, a set R of different masking regions may be determined, where the masking region set R includes at least one masking region. The masking region set is a set of respective regions in the image to-be-processed that need to be masked. In the image to-be-processed, the masking is performed on respective masking regions in the masking region set R to obtain the perturbation image. That is, for each voxel u∈∧ in the FMRI image, masking is performed on one scalar m(u) associated with the voxel. Optionally, the masking may include but is not limited to: replacing the masking region set R with a constant, adding noise to the masking region set R, and blurring the masking region set R. The perturbation images obtained by different masking methods can be expressed as follows:

$$[\varphi(x_0; m)](u) = \begin{cases} m(u)x_0(u) + (1 - m(u))u_0, & \text{constant} \\ m(u)x_0(u) + (1 - m(u))\eta(u), & \text{noise} \\ \int g_{\sigma_0 m(u)}(v - u)x_0(v)d_v, & \text{blurring} \end{cases}$$

where $m: \wedge \rightarrow [0,1]$ represents the mask, $u_0$ represents an average voxel value, $\eta(u)$ represents a Gaussian noise sample of each voxel value, and $\sigma_0$ represents a maximum isotropic standard deviation of a Gaussian blur kernel $g_\sigma$. Optionally, a relatively blurred mask can be obtained generally when $\sigma_0$ equals to 10.

By implementing the implementation, different regions can be masked so as to obtain a key region that can affect a classification result.

At 203, the server 102 classifies the perturbation image with a visualization processing model to obtain the classification result.

Specifically, on condition that the perturbation image is obtained, the perturbation image is classified with a classifier in the visualization processing model to obtain the classification result. The visualization processing model is constructed by repeated iterative training of a generator network, a discriminator network, and a classifier network using a first sample image, a second sample image-annotation pair, a noise vector, and a vector annotation. The classifier may classify brain anatomical structure features extracted from the FMRI images. For example, the FMRI images may be classified into three categories: injected with high concentration nicotine of 0.12 mg/kg, injected with low concentration nicotine of 0.03 mg/kg, and injected with normal saline. After inputting the perturbation image into the classifier, the possible classification result may be 60% probability of high concentration nicotine of 0.12 mg/kg, 30% probability of low concentration nicotine of 0.03 mg/kg, 10% probability of normal saline.

At 204, the server 102 calculates the classification result to obtain an evaluation value of the perturbation image.

Specifically, on condition that the classification result is obtained, calculation is performed on the classification result. The classifier outputs a weight vector m* belong to the classification result corresponding to different concentration nicotine addiction traits. The weight vector may be outputted by the last layer of the classifier network in the form of probability of normalized exponential function (softmax). With the calculation result of the weight vector, the evaluation value $f_c(\varphi(x_0; m))$ of the perturbation image is obtained. The evaluation value may be obtained by substituting the weight vector into a preset evaluation standard function to calculate a result. The evaluation value of the perturbation image is less than an evaluation value of the image to-be-processed without masking. The image to-be-processed without masking can also be substituted into the evaluation standard function to calculate the evaluation value $f_c(x_0)$ of the image to-be-processed without masking, where $x_0$ may represent the real FMRI image.

At 205, the visualization evaluation result is determined according to the evaluation value of the perturbation image.

Specifically, after obtaining the evaluation value of the perturbation image, the visualization evaluation result is determined, that is, the key region that affects the classification result is determined. Further, whether the masking region is the key region that affects the classification result can be determined according to the evaluation value obtained. If $f_c(\varphi(x_0; m)) \ll f_c(x_0)$, the masking region is determined as the key region that affects the classification result. Optionally, a threshold may be set for a difference between the evaluation values. If the difference between the evaluation value $f_c(\varphi(x_0; m))$ obtained by shielding the masking region set R and the evaluation value $f_c(x_0)$ of the original image to-be-processed without masking is greater than the threshold, the masking region set R is determined as the nicotine addiction activation brain region. The key region corresponding to the visualization evaluation result is an objective function for learning, which can be expressed as:

$$m^* = \mathop{\text{argmin}}_{m \in [0,1]^A} \lambda \|1 - m\|_1 + f_c \varphi(x_0; m)$$

where $\lambda$ represents that as many masks as possible are encouraged to be closed, that is, the masking region shielded is set as accurately as possible to the critical region rather than the entire FIMR image, and c represents a classification annotation, that is, the category of the nicotine addiction trait of rat.

Optionally, the classification result of the image to-be-processed may also be obtained, and weighted calculation is performed on the classification result. This optional implementation facilitates to compare the classification and calculation results of the perturbation image with the classification and calculation results of the image to-be-processed, so as to locate the masking region that significantly affects the classification result, and thus the masking region is the key region that affects the classification result.

At 206, the server 102 sends the visualization evaluation result to the client 101.

Specifically, on condition that the evaluation value is obtained, the evaluation result based on the evaluation value may be sent to the client 101. Accordingly, the client 101 receives the visualization evaluation result. Optionally, the evaluation value and corresponding masking region set R may be sent to the client 101, so that the user 103 of the client 101 may determine whether the masking region set R is the nicotine addiction brain region based on the evaluation value and corresponding masking region set R.

It can be seen that, through implementing the method described in FIG. 2, after the client 101 sends the visualization processing request, the server 102 performs masking on the image to-be-processed contained in the visualization processing request, to obtain the perturbation image masked. Masking the image to-be-processed may include comparing different regions, so as to obtain the key region that affects the classification result. The perturbation image is classified with the trained visualization processing model to obtain the classification result, and weighted calculation is performed on the calculation result to determine the visualization evaluation result. Then the visualization evaluation result is sent to the client 101. With the method of the implementation, the nicotine addiction activation region that has the greatest impact on the evaluation result of addiction traits of the rat brain may be accurately located without a large number of FMRI images as basic samples, so that visualization of the nicotine addiction brain region of the rat can be achieved.

Figure 3:
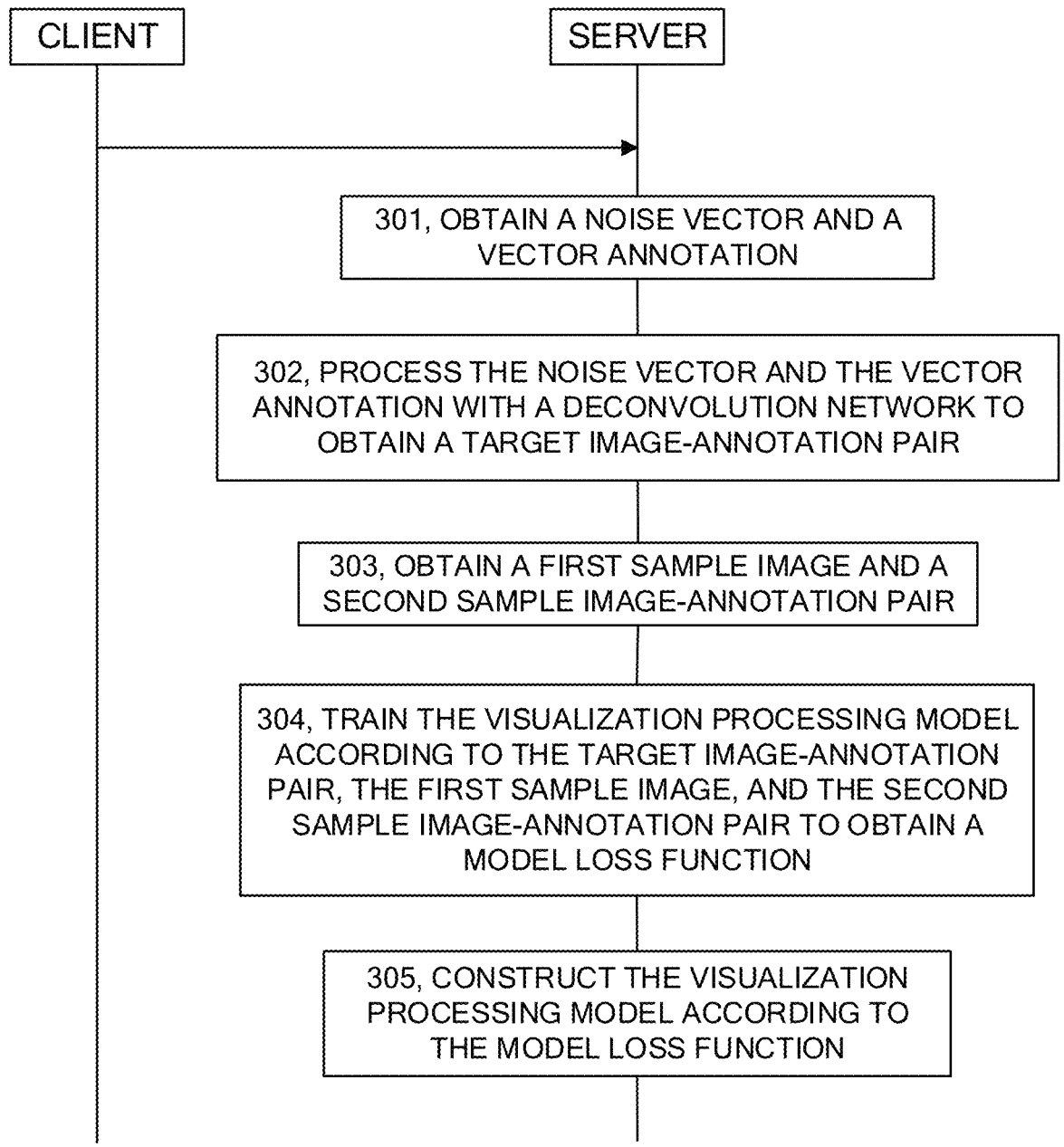
FIG. 3 is a flow chart illustrating another visualization method for evaluating brain addiction traits provided in implementations of the disclosure.

Referring to FIG. 3, FIG. 3 is a flow chart illustrating a visualization method for evaluating brain addiction traits provided in implementations of the disclosure. As illustrated in FIG. 3, the visualization method for evaluating brain addiction traits may include operations at 301 to 305.

At 301, the server 102 obtains a noise vector and a vector annotation.

Specifically, the server 102 may obtain the noise vector and the vector annotation matched with the noise vector from the client 101 or other data storage platforms. The noise vector is a one-dimensional random noise vector with Gaussian distribution. The noise vector is used to be inputted into the generator to allow the generator network to generate a corresponding FMRI image according to the noise vector. Accordingly, the vector annotation is a classification annotation corresponding to the noise vector, such as high concentration nicotine of 0.12 mg/kg, low concentration nicotine of 0.03 mg/kg, normal saline, etc. The vector annotation is inputted into the generator network in the form of one-hot code along with the corresponding noise vector.

At 302, the server 102 processes the noise vector and the vector annotation with a deconvolution network to obtain a target image-annotation pair.

Specifically, on condition that the server 102 obtains the noise vector and the corresponding vector annotation, the noise vector and the corresponding vector annotation are inputted into the generator network including tensorized deconvolution layers, so that the generator network generates the corresponding target image-annotation pair. The target image-annotation pair includes a target generated image and a target generated image annotation. The target generated image is an FMRI image generated by the generator, and the target generated image annotation can be understood as the above vector annotation in a one-hot encoding mode.

Specifically, the generator network adopts a deep deconvolutional neural network including multiple tensorized deconvolution layers. After multiple layers of deconvolution on the noise vector, the generated brain anatomical feature map is enlarged layer by layer, and an image with a same size as the real FMRI image is generated. Each deconvolution layer except the last layer includes a deconvolution layer, a normalization layer (batch normalization), and an activation function layer (Leaky ReLU), and the last deconvolution layer includes a deconvolution layer and an activation function layer (tanh).

Figure 4:
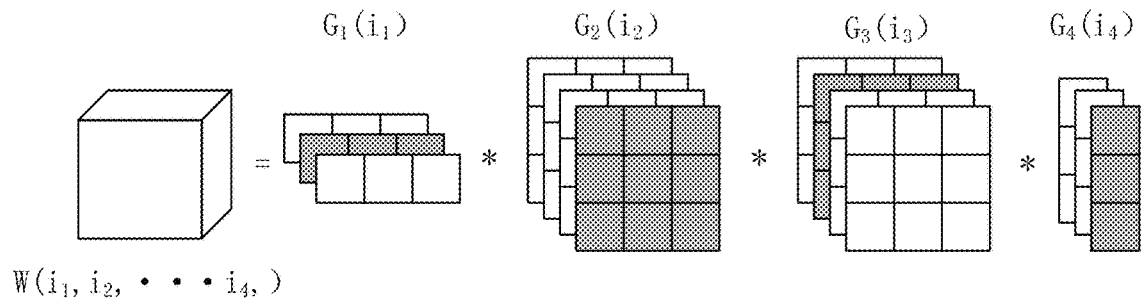
FIG. 4 is a schematic diagram illustrating tensor-train decomposition of a network layer provided in implementations of the disclosure.

Further, the disclosure makes tensorized improvements to the deconvolution layers in the above-mentioned deep deconvolutional neural network. Parameters of the deconvolution layers are compressed with the tensor-train decomposition method. A tensor of a convolutional kernel of the deconvolution layer can be expressed in the form of tensor-train decomposition, as illustrated in FIG. 4. FIG. 4 is a schematic diagram illustrating the tensor-train decomposition. The deconvolution layers can be decomposed according to the following formulas:

$$W((i_1,j_1), \ldots ,(i_d,j_d)) = G_1[i_1,j_1] G_2[i_2,j_2] \ldots G_d[i_d,j_d]$$

Thus the tensor-train decomposition of the deconvolution layer includes the following steps:

Network input layer: $\chi(x, y, z, c) \xrightarrow{reshape} \tilde{\chi}(x, y, z, c_1, c_2, \ldots, c_d)$ Network output layer: $Y(x, y, z, s) \xrightarrow{reshape} \tilde{Y}(x, y, z, s_1, s_2, \ldots, s_d)$ Convolutional kernal: $K(x, y, z, c, s) \xrightarrow{TT\text{-}format}$ $$G_0[i, j, k]G_1[c_1, s_1] \ldots G_d[c_d, s_d]$$

After the convolutional layer is tensorized, we get $$\tilde{Y}(x,y,z,s_1,\ldots,s_d) = \Sigma_{i=1}^{l} \Sigma_{j=1}^{l} \Sigma_{k=1}^{l} \Sigma_{c_1,\ldots,c_d} \tilde{X}(i+x-1, j+y-1, c1, \ldots c_d G_0[i,j,k] G_1[c_1,s_1] \ldots G_d[c_d,s_d]$$

where $c = \Pi_{i=1}^{d} c_i$, $s = \Pi_{i=1}^{d} s_i$.

At 303, the server 102 obtains a first sample image and a second sample image-annotation pair.

Specifically, the server 102 may obtain the first sample image and the second sample image-annotation pair from the client 101 or other data storage platforms. The second sample image-annotation pair includes a second sample image and a sample image annotation. The first sample image and the second sample image are both real FMRI images. The sample image annotation is a classification annotation corresponding to the second sample image. The sample image annotation and the vector annotation in the above step 301 belong to a same kind of annotation. Further, the first sample image is used to be inputted into the classifier network, so that the classifier network performs classification prediction on the first sample image, to obtain a predicted annotation of the first sample image. The second sample image-annotation pair is used to be inputted with the target image-annotation pair generated by the classifier, the first sample image, and the predicted annotation of the first sample image into a discriminator model, so as to train a visualization processing model according to a discrimination result. Alternatively, the second sample image-annotation pair is used to be inputted into the classifier for supervised training, to obtain a cross entropy.

At 304, the server 102 trains the visualization processing model according to the target image-annotation pair, the first sample image, and the second sample image-annotation pair to obtain a model loss function.

Specifically, on condition that the target image-annotation pair, the first sample image, and the second sample image-annotation pair are obtained, the server 102 trains the visualization processing model according to the target image-annotation pair, the first sample image, and the second sample image-annotation pair to obtain the model loss function, so that the visualization processing model can be constructed further according to the model loss function, that is, operation at 305 is performed.

Figure 5:
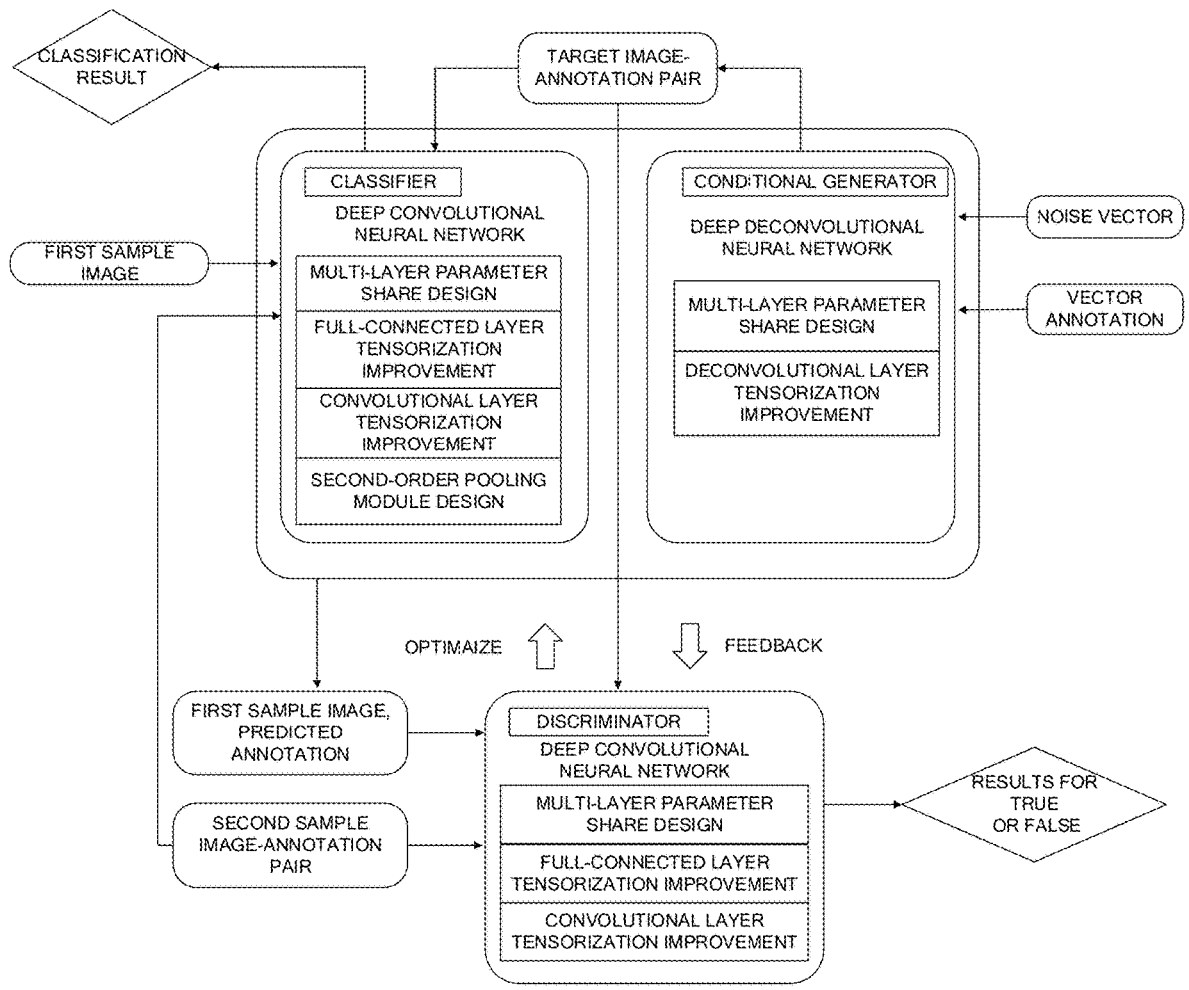
FIG. 5 is a framework diagram illustrating a visualization processing model provided in implementations of the disclosure.

Specifically, FIG. 5 illustrates a framework diagram of the visualization processing model. The model is mainly based on a ternary generative adversarial network that includes the generator, the classifier, and the discriminator. As illustrated in FIG. 5, the training process mainly includes the following. The noise vector and the vector annotation are inputted into the generator, to obtain an FMRI image-annotation pair generated by the generator. The FMRI image-annotation pair can be referred to as the target image-annotation pair in this disclosure. A real unannotated FMRI image is obtained and preprocessed by normalization. The real unannotated FMRI image can be referred to as the first sample image in this disclosure. At the same time, a real annotated FMRI image-annotation pair is obtained and a real FMRI image contained therein is preprocessed by normalization. The real annotated FMRI image-annotation pair can be referred to as the second sample image-annotation pair in this disclosure. Then the server 102 can train the visualization processing model according to the target image-annotation pair, the first sample image, and the second sample image-annotation pair. Specifically, the target image-annotation pair generated by the generator is inputted into the discriminator to obtain a first discrimination result. Meanwhile, based on a construction loss among the first sample image, the second sample image, and the target generated image inputted into the classifier, a loss function of the generator is constructed. With a back propagation algorithm, kernel matrix parameters of tensor decomposition of the generator network layer are updated according to the gradient descent of the generated loss function of the generator. The first sample image is inputted into the classifier to obtain the predicted annotation, and the first sample image and the predicted annotation are inputted into the discriminator for discrimination, so as to obtain a second discrimination result. Meanwhile, based on a cross entropy loss function among the first sample image and the second sample image-annotation pair inputted into the classifier, and the target image-annotation pair generated by the generator network, a loss function of the classifier is constructed. With a back propagation algorithm, kernel matrix parameters of tensor decomposition of the classifier network layer are updated according to the gradient descent of the generated loss function of the classifier. The first sample image, the predicted annotation of the first sample image, the second sample image-annotation pair, and the target image-annotation pair generated by the generator network are inputted into the discriminator for discrimination, so as to construct a loss function of the discriminator. With a back propagation algorithm, kernel matrix parameters of tensor decomposition of the discriminator network layer are updated according to the gradient descent of the generated loss function of the discriminator.

Further, the model loss function includes a generation loss function which is the loss function of the generator. The visualization processing model may be trained according to the target image-annotation pair, the first sample image, and the second sample image-annotation pair to obtain the model loss function as follows. The target image-annotation pair is discriminated to generate a first discrimination result, where the target image-annotation pair includes the target generated image and the target generated image annotation. A reconstruction loss is determined according to the target generated image and the second sample image. The generation loss function of the generator is determined according to the first discrimination result and the reconstruction loss.

Specifically, the loss function of the generator includes two components. One component is a loss that makes the discrimination result tend to be true after inputting the generated target image-annotation pair into the discriminator for discrimination, and another component is a constructed loss between the target generated image generated by the generator and real FMRI images, where the real FMRI images are the first sample image and the second sample image. Therefore, the loss function of the generator may be expressed as follows:

$$\frac{\partial G\_loss}{\partial G_k[i_k, j_k]} = \nabla_{\theta_g} \left[ \sum_{(x_g, y_g)} \log(1 - D(x_g, y_g)) + \lambda \|x_{label} - y_g\|_{L_1} \right]$$

-continued where $$\sum_{(x_g, y_g)} \log(1 - D(x_g, y_g))$$

represents the loss that makes the discrimination result of the target image-annotation pair tend to be true; and $$\lambda \|x_{label} - y_g\|_{L_1}$$

represents the constructed loss between the target generated image generated by the generator and the real FMRI image.

Based on the implementation, the loss function of the generator can be determined from two aspects, so that the constructed visualization model is more accurate. In addition, by constructing the generator model, the random noise vector can be converted into the accurate FMRI image, so that the problem of difficult in obtaining FMRI images can be solved, thus reducing the experimental cost.

Further, the model loss function includes a classification loss function, which is the loss function of the classifier. The visualization processing model may be trained according to the target image-annotation pair, the first sample image, and the second sample image-annotation pair to obtain the model loss function as follows. The first sample image may be classified to obtain the predicted annotation of the first sample image, and the first sample image and the predicted annotation are discriminated to obtain a second discrimination result. Supervised training is performed on the target image-annotation pair and the second sample image-annotation pair to obtain a first cross entropy of the target image-annotation pair and a second cross entropy of the second sample image-annotation pair. The classification loss function of the classifier is determined according to the second discrimination result, the first cross entropy, and the second cross entropy.

Specifically, the loss function of the classifier includes two components. One component is a cross entropy loss function obtained by performing supervised training on the target image-annotation pair and the second sample image-annotation pair. Another component is an unsupervised loss that makes the discrimination result tend to be true after inputting the first sample image and the predicted annotation into the discriminator for discrimination, where the predicted annotation is obtained by classification of the first sample image. Therefore, the loss function of the classifier may be expressed as follows:

$$\frac{\partial C\_loss}{\partial G_k[i_k, j_k]} = \nabla_{\theta_C} [L_{supervised} + L_{unsupervised}]$$

$$L_{supervised} = R_L + \alpha_p R_p$$

$$R_L = E_{(x_{label}, y) \sim P_{real}(x, y)}[-\log P_c(y \mid x_{label})]$$

$$R_p = E_{(x_g, y_g) \sim P_g(x, y)}[-\log P_c(y_g \mid x_g)]$$

$$L_{unsupervised} = E_{x_{unlabel} \sim P_c(x)}[\log(1 - D(x_{unlabel}, C(x_{unlabel})))]$$

where $R_p$ represents the first cross entropy, $R_L$ represents the second cross entropy, $L_{supervised}$ represents the supervised loss, and $L_{unsupervised}$ represents the semi-supervised loss. Specifically, the second cross entropy equals to calculating a relative entropy (Kullback-Leibler divergence, KL divergence) between a distribution $P_c(x,y)$ learned by the classifier and a real data distribution $P_{real}(x,y)$. By introducing the first cross entropy to calculate the cross entropy of the target generated image-annotation pair, the generator may generate an FMRI image-annotation pair close to the real distribution, so that the classification performance of the classifier is improved. Minimizing $R_p$ equals to minimizing the relative entropy (KL divergence) $D_{KL}(P_g(x,y) \| P_c(x,y))$. Since $P_g(x,y)/P_c(x,y)$ cannot be calculated directly, the KL divergence $D_{KL}(P_g(x,y) \| P_c(x,y))$ cannot be calculated directly either. This classifier model achieves minimization of the relative entropy (KL divergence) $D_{KL}(P_g(x,y) \| P_c(x,y))$ by indirectly minimizing $R_p$.

Figure 6:
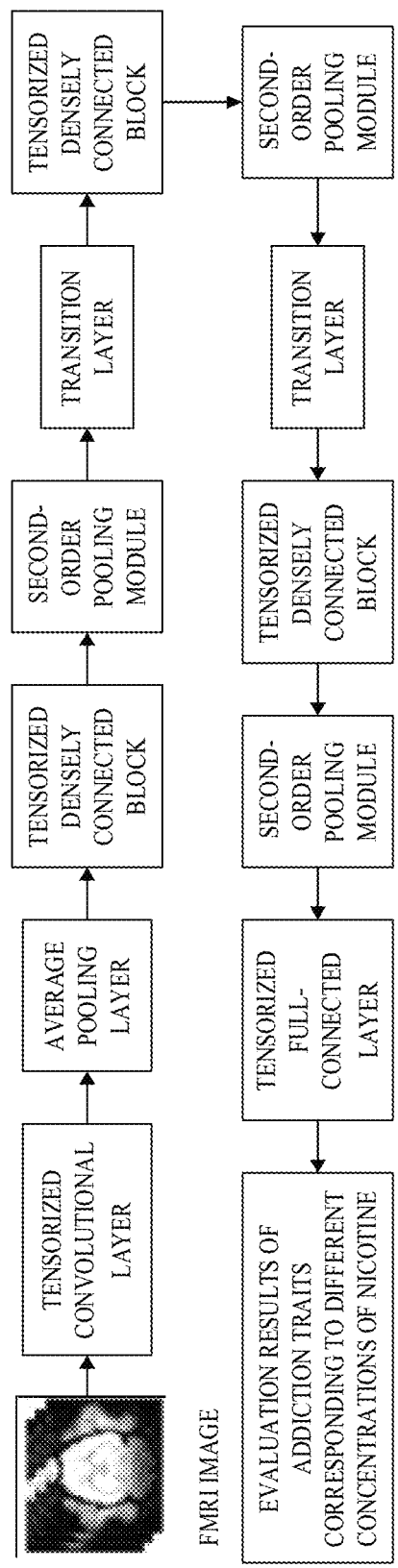
FIG. 6 is a schematic structural diagram illustrating a classifier network provided in implementations of the disclosure.

Specifically, FIG. 6 illustrates a schematic structural diagram of the classifier network. The classifier network includes a tensorized convolutional layer, an average pooling layer, a tensorized densely connected block, a second-order pooling module, and a transition layer. After the FMRI image is inputted to the classifier network, through processing with the above-mentioned components, the evaluation results of addiction traits corresponding to different concentrations of nicotine can be obtained. The evaluation results can be understood as the classification results. For the relevant description of the classification results, reference may be made to step 203, which will not be repeated herein. Both the convolution kernel tensor of the tensorized convolution layer and the weight matrix of the full-connected layer can be expressed in the form of tensor-train decomposition, and the related schematic diagram of the tensor-train decomposition can be seen in FIG. 4 and reference made be made to step 302. The steps of tensor decomposition of the convolutional layer are the same as the steps of tensor decomposition of the deconvolutional layer, and reference made be made to step 302, which will not be repeated herein. Tensor decomposition can also be applied to the weighted tensor W of the full-connected layer according to the following formula:

$$W((i_1, j_1), \ldots, (i_d, j_d)) = G_1[i_1 j_1] G_2[i_2 j_2] \ldots G_d[i_d j_d]$$

So the tensorization of the full-connected layer can be expressed as follows:

$$Y(i_1, \ldots, i_d) \Sigma_{j_1, \ldots, j_d} G_1[i_1 j_1] G_2[i_2 j_2] \ldots G_d[i_d j_d] \chi$$
$$(j_1 \ldots j_d) + B(i_1, \ldots, i_d)$$

Figure 7:
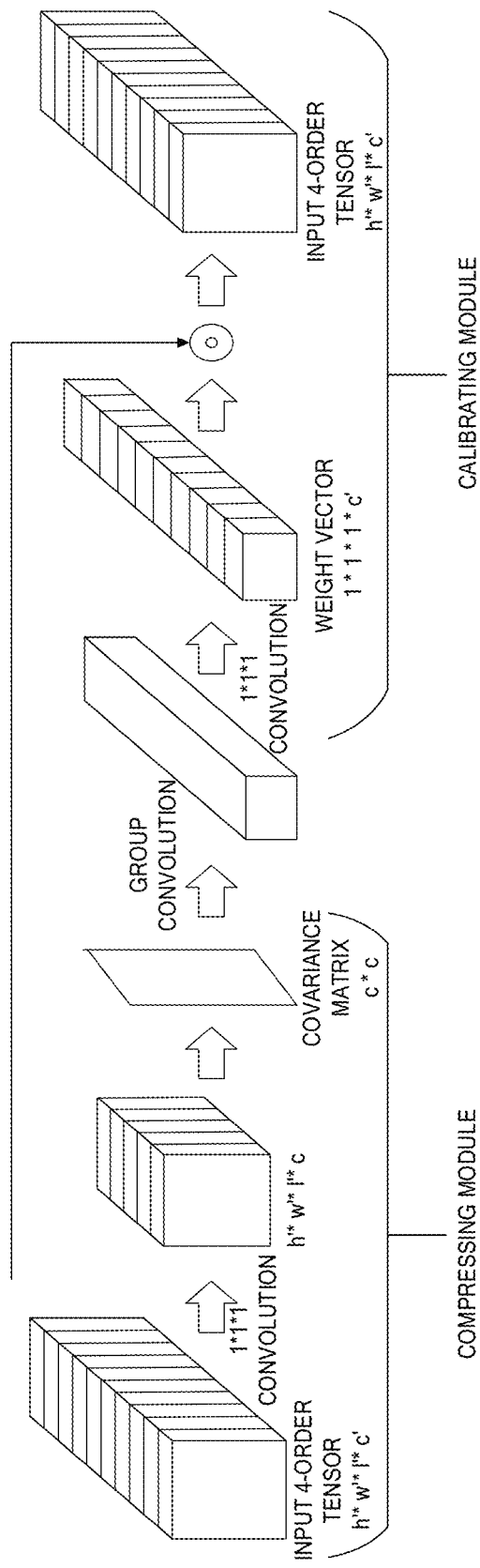
FIG. 7 is a schematic structural diagram illustrating a second-order pooling module provided in implementations of the disclosure.

The second-order pooling module is deployed after the tensorized densely connected block. FIG. 7 illustrates a schematic structural diagram of the second-order pooling module. The second-order pooling module includes two components, that is, a compressing module and a calibrating module. In a process of processing the FMRI image by the classifier, the second-order pooling module performs channel dimensionality reduction on the input 4-dimensional feature map with 1×1×1 convolution, and calculates covariance information between different channels in the 4-dimensional feature map after dimensionality reduction, so as to obtain a covariance matrix. According to the covariance matrix, weight vectors are obtained by group convolution and 1×1×1 convolution, and the number of the weight vectors is the same as the number of channels of the 4-dimensional feature map. An inner product of the weight vectors and the input feature map is calculated to obtain a weighted output feature map. Finally, under the action of the self-attention mechanism, the back propagation algorithm is used to make the weight of the important channel of the feature map larger, and the weight of the unimportant channel smaller, so as to extract a more representative global high-level feature map and improve the accuracy of evaluation of brain nicotine addiction traits.

Based on the implementation, the generator and the classifier promote each other and jointly learn the potential high-dimensional probability distribution of FMRI images. In addition, the classifier model is constructed based on the second-order pooling module, which can extract more discriminative features related to brain nicotine addiction traits through the dependence of different regions of the FMRI image and the correlation information between different channels of high-order features, so that the accuracy of the evaluation of brain nicotine addiction traits can be improved. In this way, the classifier model can be applied to the mask-based visualization evaluation, that is, steps 201-206.

Further, the above model loss function includes a discrimination loss function, which is a loss function of the discriminator. The visualization processing model may be trained according to the target image-annotation pair, the first sample image, and the second sample image-annotation pair to obtain the model loss function as follows. The target image-annotation pair is discriminated to generate a third discrimination result. The first sample image and the predicted annotation are discriminated to generate a fourth discrimination result. The second sample image-annotation pair is discriminated to generate a fifth discrimination result. The discrimination loss function of the discriminator is determined according to the third discrimination result, the fourth discrimination result, and the fifth discrimination result. The first sample image and the second sample image are inputted in the form of fourth-order tensors, and the predicted annotation and the image annotation of the second sample image are inputted in the form of one-hot code.

Specifically, the loss function of the discriminator includes three components. A first component is a loss that makes the discrimination result tend to be false after performing discrimination on the target image-annotation pair. A second component is a loss that makes the discrimination result tend to be false after performing discrimination on the first sample image and the corresponding predicted annotation. A third component is a loss that makes the discrimination result tend to be true after performing discrimination on the second sample image-annotation pair. Thus the loss function of the discriminator may be expressed as follows:

$$\frac{\partial D_{loss}}{\partial G_k[i_k, j_k]} =$$
$$\nabla_{\theta_g} \left[ \sum_{(x_{label}, y)} \log D(x_{label}, y) + \alpha \sum_{(x_{unlabel}, y_c)} \log(1 - D(x_{unlabel}, y_c)) + (1+\alpha) \sum_{(x_g, y_g)} \log(1 - D(x_g, y_g)) \right]$$

where $(1+\alpha)\Sigma_{(x_g,y_g)} \log(1-D(x_g,y_g))]$ represents the loss that makes the discrimination result for the target image-annotation pair tend to be false, $\alpha\Sigma_{(x_{unlabel},y_c)} \log(1-D(x_{unlabel},y_c))$ represents the loss that makes the discrimination result for the first sample image and the corresponding predicted annotation tend to be false, and $\Sigma_{(x_{label},y)} \log D(x_{label},y)$ represents the loss that makes the discrimination result for the second sample image-annotation pair tend to be false.

Specifically, the discriminator network performs feature extraction with the dense deep neural network. Optionally, the dense deep neural network may have 30 layers, including tensorized convolutional layers, tensorized densely connected blocks, tensorized transition layers, and tensorized full-connected layers. The tensorized convolutional layers includes a convolutional layer, a normalization layer (Batch Normalization), and an activation function layer (Leaky ReLU). The sigmoid function in the tensorized full-connected layers is used to judge the true or false of the target image-annotation pair, the first sample image and corresponding predicted annotation, and the second sample image-annotation pair. Both the convolutional kernel tensor of the tensorized convolution layer and the weight matrix of the full-connected layer can be expressed in the form of tensor-train decomposition. The relevant schematic diagram of tensor-train decomposition can be seen in FIG. 4 and reference may be made to the above step 302. In addition, for related description of full-connected layer and tensor decomposition of the convolutional later, reference may be made to the corresponding parts for step 302 and the classifier network, which will not be repeated herein. The target image-annotation pair, the first sample image and its corresponding predicted annotation, and the second sample image-annotation pair are inputted to the discriminator and subjected to feature extraction by respective modules to obtain a feature map of the rat brain that retains spatial information and time series information. The last tensorized fully connected-layer judges the true or false of each image-annotation pair, and the corresponding discrimination results are outputted.

Based on the implementation, the discriminator can discriminate data outputted by the generator and the classifier. Using the ternary generative adversarial network composed of the generator, the classifier, and the discriminator, the generator is enabled to generate the image closer to the real FMRI image, and the classifier is enabled to extract the more discriminative feature relevant to the nicotine addiction traits, thus obtaining more accurate classification results.

At 305, the server 102 constructs the visualization processing model according to the model loss function.

Specifically, after obtaining the model loss function that includes the generation loss function, the discrimination loss function, and the classification loss function, the visualization processing model is constructed according to the model loss function.

Further, using a back propagation algorithm, a parameter of the generator can be update according to the loss function of the generator, a parameter of the classifier can be updated according to the loss function of the classifier, and a parameter of the discriminator can be updated according to the loss function of the discriminator. Therefore, the visualization processing model can be constructed according to the parameter of the generator, the parameter of the classifier, and the parameter of the discriminator.

Specifically, the parameters of the kernel matrix $G_k[i_k, j_k]$ of tensor decomposition of the generator network layer can be updated according to the gradient descent of the loss function of the generator. The parameters of the kernel matrix $G_k[i_k, j_k]$ of tensor decomposition of the classifier network layer can be updated according to the gradient descent of the loss function of the classifier. The parameters of the kernel matrix $G_k[i_k, j_k]$ of tensor decomposition of the discriminator network layer can be updated according to the gradient descent of the loss function of the discriminator. Thus in the optimization process of the loss function, back propagation is used to find the gradient of the loss function to the kernel matrix $G_k[i_k, j_k]$. With iterative and collaborative training of the generator network, classifier network, and discriminator network, the generator, classifier, and discriminator are continuously optimized. Therefore, the target generated image generated by the generator is more in line with the distribution of real FMRI image data. In addition, the classifier can more accurately distinguish the boundaries between different analogies of the real distribution, and feedback the FMRI image-annotation pair to the discriminator, so that the discrimination performance of the discriminator can be further improved. Finally, the entire ternary generative adversarial network model reaches the Nash equilibrium, and an optimized visualization processing model is obtained.

Optionally, the process of training the visualization processing model can be divided into three processes, that is, training, validating, and testing. Therefore, after obtaining sample image data such as the first sample image and the second sample image, the sample image data can be divided according to certain proportions so as to obtain training set samples, validation set samples, and test set samples of different proportions. For example, the samples are divided in the proportion 80%:10%:10%. The training process may be referred to the implementation in steps 301 to 305. In each iterative training process, the validation set samples are used to validate the trained visualization evaluation model, and the optimal visualization evaluation model is selected and obtained based on the validation result. The test set is used to be inputted into the classifier of the optimized visualization evaluation model to obtain the evaluation result of nicotine addiction traits based on masking, that is, steps 201 to 206, so that visualization of the nicotine addiction activation brain region can be achieved.

As can be seen, by implementing the method illustrated in FIG. 3, after obtaining the noise vector and the vector annotation, the server 102 processes the noise vector and the vector annotation with the deconvolutional network so as to obtain the target image-annotation pair. Then the visualization processing model can be trained according to the target image-annotation pair and the obtained first sample image and second sample image-annotation pair to obtain the model loss function that includes the generation loss function, the classification loss function, and the discrimination loss function. According to the model loss function, the visualization processing model is constructed. By implementing the implementation, the random noise vector can be converted into the accurate FMRI image, so that the problem of difficulty in obtaining FMRI images can be solved, thus saving the experiment cost. In addition, it can also promote the classifier to extract more discriminative features related to nicotine addiction traits, and get more accurate classification results, so that the trained and optimized classifier can be used to obtain changes in the evaluation results of nicotine addiction traits caused by shielding different masking regions in the FMIR image. Therefore, the nicotine addiction brain regions can be more intuitively and accurately located, and the visualization of the evaluation results can be realized.

Figure 8:
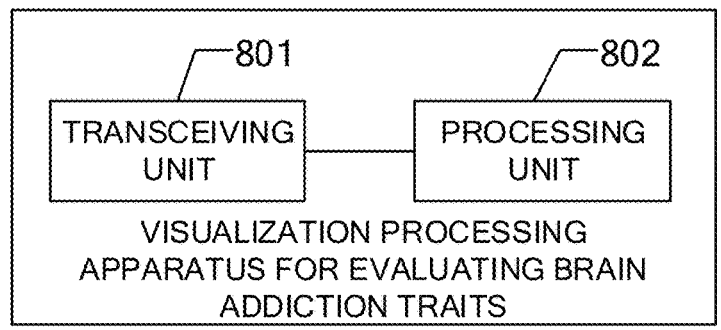
FIG. 8 is a schematic structural diagram illustrating a visualization processing apparatus for evaluating brain addiction traits provided in implementations of the disclosure.

Based on the description of the method implementations above, the implementations of the disclosure further provides a visualization processing apparatus for evaluating brain addiction traits. The visualization processing apparatus for evaluating brain addiction traits may be a computer program (including program codes) running in a processing device. As illustrated in FIG. 8, the visualization processing apparatus for evaluating brain addiction traits may run a transceiving unit 801 and a processing unit 802.

The transceiving unit 801 is configured to receive a visualization processing request from a client, where the visualization processing request contains an image to-be-processed and is used for requesting a visualization evaluation result of the image to-be-processed.

The processing unit 802 is configured to mask the image to-be-processed to obtain a perturbation image masked; classify the perturbation image with a visualization processing model to obtain a classification result, and calculate the classification result to obtain an evaluation value of the perturbation image, where the evaluation value of the perturbation image is less than an evaluation value of the image to-be-processed without masking; and determine the visualization evaluation result according to the evaluation value of the perturbation image.

The transceiving unit 801 is further configured to send the visualization evaluation result to the client.

In an implementation, the masking includes blurring. In terms of masking the image to-be-processed to obtain a perturbation image masked, the processing unit 802 is configured to determine a masking region set, where the masking region set includes at least one masking region; and in the image to-be-processed, blur respective masking regions in the masking region set to obtain the perturbation image, where the image to-be-processed includes the respective masking regions in the masking region set.

In an implementation, the processing unit 802 is further configured to, before classifying the perturbation image with the visualization processing model, obtain a noise vector and a vector annotation, and process the noise vector and the vector annotation with a deconvolution network to obtain a target image-annotation pair, where the target image-annotation pair includes a target generated image and a target generated image annotation; obtain a first sample image and a second sample image-annotation pair, where the second sample image-annotation pair includes a second sample image and a sample image annotation; train the visualization processing model according to the target image-annotation pair, the first sample image, and the second sample image-annotation pair to obtain a model loss function; and construct the visualization processing model according to the model loss function.

In an implementation, the model loss function includes a generation loss function, where the generation loss function is a loss function of a generator. In terms of training the visualization processing model according to the target image-annotation pair, the first sample image, and the second sample image-annotation pair to obtain the model loss function, the processing unit 802 is configured to discriminate the target image-annotation pair to generate a first discrimination result, where the target image-annotation pair includes the target generation image and the target generation image annotation; determine a reconstruction loss according to the target generated image, the first sample image, and the second sample image; and determine the generation loss function of the generator according to the first discrimination result and the reconstruction loss.

In an implementation, the model loss function includes a classification loss function, where the classification loss function is a loss function of a classifier. In terms of training the visualization processing model according to the target image-annotation pair, the first sample image, and the second sample image-annotation pair to obtain the model loss function, the processing unit 802 is configured to classify the first sample image to obtain a predicted annotation of the first sample image, and discriminate the first sample image and the predicted annotation to obtain a second discrimination result; perform supervised training on the target image-annotation pair and the second sample image-annotation pair to obtain a first cross entropy of the target image-annotation pair and a second cross entropy of the second sample image-annotation pair; and determine the classification loss function of the classifier according to the second discrimination result, the first cross entropy, and the second cross entropy.

In an implementation, the model loss function includes a discrimination loss function, where the discrimination loss function is a loss function of a discriminator. In terms of training the visualization processing model according to the target image-annotation pair, the first sample image, and the second sample image-annotation pair to obtain the model loss function, the processing unit 802 is configured to discriminate the target image-annotation pair to generate a third discrimination result; discriminate the first sample image and the predicted annotation to generate a fourth discrimination result; discriminate the second sample image-annotation pair to generate a fifth discrimination result; and determine the discrimination loss function of the discriminator according to the third discrimination result, the fourth discrimination result, and the fifth discrimination result.

In an implementation, the model loss function includes the generation loss function, the classification loss function, and the discrimination loss function. In terms of constructing the visualization processing model according to the model loss function, the processing unit 802 is configured to update a parameter of the generator according to a loss function of the generator using a back propagation algorithm; update a parameter of the classifier according to a loss function of the classifier using a back propagation algorithm; update a parameter of the discriminator according to a loss function of the discriminator using a back propagation algorithm; and construct the visualization processing model according to the parameter of the generator, the parameter of the classifier, and the parameter of the discriminator.

According to an implementation of the disclosure, some steps involved in the visualization method for evaluating brain addictive traits shown in FIG. 2 and FIG. 3 can be executed by the processing unit in the visualization processing apparatus for evaluating brain addictive traits. For example, steps 201 and 206 shown in FIG. 2 may be executed by the transceiving unit 801. For another example, step 202 shown in FIG. 2 may be executed by the processing unit 802. According to another implementation of the disclosure, respective units in the visualization processing apparatus for evaluating brain addiction traits can be separately or completely combined into one or several additional units, or some of the units can be further divided into multiple functionally smaller units, which can achieve the same operation without affecting the realization of the technical effects of the implementations of the disclosure.

Figure 9:
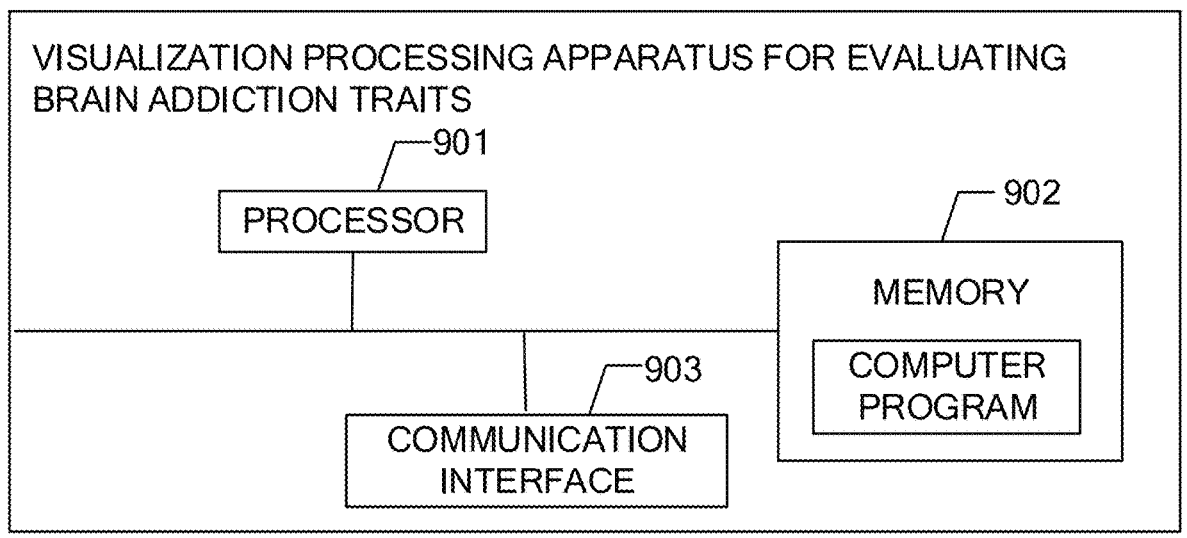
FIG. 9 is a schematic structural diagram illustrating another visualization processing apparatus for evaluating brain addiction traits provided in implementations of the disclosure.

FIG. 9 is a schematic structural diagram illustrating a visualization processing apparatus for evaluating brain addiction traits provided in implementations of the disclosure. The visualization processing apparatus for evaluating brain addiction traits includes a processor 901, a memory 902, and a communication interface 903. The processor 901, the memory 902, and the communication interface 903 are connected through at least one communication bus. The processor 901 is configured to support the processing device to perform corresponding functions of the processing device in the methods of FIG. 2 and FIG. 3.

The memory 902 is configured to store at least one instruction adapted for being loaded and executed by the processor, and the at least one instruction may be one or more computer programs (including program codes).

The communication interface 903 is configured to receive data and to send data. For example, the communication interface 903 is configured to send the visualization processing request and the like.

In the implementations of the disclosure, the processor 901 may invoke the program codes stored in the memory 902 to perform the following operations.

A visualization processing request is received from a client through the communication interface 903, where the visual processing request contains an image to-be-processed and is used for requesting a visualization evaluation result of the image to-be-processed. The image to-be-processed is masked to obtain a perturbation image masked. The perturbation image is classified with a visualization processing model to obtain a classification result, and calculation is performed on the classification result to obtain an evaluation value of the perturbation image, where the evaluation value of the perturbation image is less than an evaluation value of the image to-be-processed without masking. The visualization evaluation result is determined according to the evaluation value of the perturbation image. The visualization evaluation result is sent to the client through the communication interface 903.

As an optional implementation, the masking includes blurring. In terms of masking the image to-be-processed to obtain a perturbation image masked, the processor 901 may invoke the program codes stored in the memory 902 to perform the following operations.

A masking region set is determined, where the masking region set includes at least one masking region. In the image to-be-processed, respective masking regions in the masking region set are blurred to obtain the perturbation image, where the image to-be-processed comprises the respective masking regions in the masking region set.

As an optional implementation, before classifying the perturbation image with the visualization processing model, the processor 901 may invoke the program codes stored in the memory 902 to perform the following operations.

A noise vector and a vector annotation are obtained, and the noise vector and the vector annotation are processed with a deconvolution network to obtain a target image-annotation pair, where the target image-annotation pair includes a target generated image and a target generated image annotation. A first sample image and a second sample image-annotation pair are obtained, where the second sample image-annotation pair includes a second sample image and a sample image annotation. The visualization processing model is trained according to the target image-annotation pair, the first sample image, and the second sample image-annotation pair to obtain a model loss function. The visualization processing model is constructed according to the model loss function.

As an optional implementation, the model loss function includes a generation loss function, where the generation loss function is a loss function of a generator.

In terms of training the visualization processing model according to the target image-annotation pair, the first sample image, and the second sample image-annotation pair to obtain the model loss function, the processor 901 may invoke the program codes stored in the memory 902 to perform the following operations.

The target image-annotation pair is discriminated to generate a first discrimination result, where the target image-annotation pair includes the target generation image and the target generation image annotation. A reconstruction loss is determined according to the target generated image, the first sample image, and the second sample image. The generation loss function of the generator is determined according to the first discrimination result and the reconstruction loss.

As an optional implementation, the model loss function includes a classification loss function, where the classification loss function is a loss function of a classifier.

In terms of training the visualization processing model according to the target image-annotation pair, the first sample image, and the second sample image-annotation pair to obtain the model loss function, the processor 901 may invoke the program codes stored in the memory 902 to perform the following operations.

The first sample image is classified to obtain a predicted annotation of the first sample image, and the first sample image and the predicted annotation are discriminated to obtain a second discrimination result. Supervised training is performed on the target image-annotation pair and the second sample image-annotation pair to obtain a first cross entropy of the target image-annotation pair and a second cross entropy of the second sample image-annotation pair. The classification loss function of the classifier is determined according to the second discrimination result, the first cross entropy, and the second cross entropy.

As an optional implementation, the model loss function includes a discrimination loss function, where the discrimination loss function is a loss function of a discriminator.

In terms of training the visualization processing model according to the target image-annotation pair, the first sample image, and the second sample image-annotation pair to obtain the model loss function, the processor 901 may invoke the program codes stored in the memory 902 to perform the following operations.

The target image-annotation pair is discriminated to generate a third discrimination result. The first sample image and the predicted annotation are discriminated to generate a fourth discrimination result. The second sample image-annotation pair is discriminated to generate a fifth discrimination result. The discrimination loss function of the discriminator is determined according to the third discrimination result, the fourth discrimination result, and the fifth discrimination result.

As an optional implementation, the model loss function includes the generation loss function, the classification loss function, and the discrimination loss function.

In terms of constructing the visualization processing model according to the model loss function, the processor 901 may invoke the program codes stored in the memory 902 to perform the following operations.

A parameter of the generator is updated according to a loss function of the generator using a back propagation algorithm. A parameter of the classifier is updated according to a loss function of the classifier using a back propagation algorithm. A parameter of the discriminator is updated according to a loss function of the discriminator using a back propagation algorithm. The visualization processing model is constructed according to the parameter of the generator, the parameter of the classifier, and the parameter of the discriminator.

The implementations of the disclosure also provide a computer-readable storage medium, which can be used to store computer software instructions used by the processing device in the implementations shown in FIG. 2 and FIG. 3. At least one instruction suitable for being loaded and executed by the processor is also stored in the storage space, and the instruction may be one or more computer programs (including program codes).

The above-mentioned computer-readable storage medium includes, but is not limited to, flash memory, hard disk, and solid-state hard disk.

A person of ordinary skill in the art may realize that the units and algorithm steps described in the examples in combination with the implementations disclosed in the disclosure can be implemented by electronic hardware or a combination of computer software and electronic hardware. Whether these functions are implemented by hardware or software depends on the specific application and design constraint conditions of the technical solution. Professionals and technicians can use different methods for each specific application to implement the described functions, but such implementation should not be considered beyond the scope of this disclosure.

The above-mentioned implementations may be implemented in whole or in part by software, hardware, firmware, or any combination thereof. When implemented by software, it can be implemented in the form of a computer program product in whole or in part. The computer program product includes one or more computer instructions. When the computer program instructions are loaded and executed on the computer, the processes or functions according to the implementations of the disclosure are generated in whole or in part. The computer can be a general-purpose computer, a special-purpose computer, a computer network, or other programmable devices. The computer instructions can be stored in the computer-readable storage medium or transmitted through the computer-readable storage medium. Computer instructions can be sent from one website site, computer, server or data center to another website site, computer, server or data center via wired (such as coaxial cable, optical fiber, digital subscriber line (DSL)) or wireless (such as infrared, wireless, microwave, etc.) connections. The computer-readable storage medium may be any available medium that can be accessed by a computer or a data storage device such as a server or data center integrated with one or more available media. The usable medium may be a magnetic medium (for example, a floppy disk, a hard disk, and a magnetic tape), an optical medium (for example, a DVD), or a semiconductor medium (for example, a solid state disk (Solid State Disk, SSD)).

The detail description described above further describe the purpose, technical solutions, and beneficial effects of the disclosure in detail. It should be understood that the foregoing are only specific implementations of the disclosure, and are not intended to limit the scope of the disclosure. Any modification, equivalent replacement, improvement, etc. made on the basis of the technical solution of this disclosure shall be included in the protection scope of this disclosure.

What is claimed is:

1. A visualization method for evaluating brain addiction traits, comprising:
    receiving a visualization processing request from a client, wherein the visual processing request contains an image to-be-processed and is used for requesting a visualization evaluation result of the image to-be-processed;
    masking the image to-be-processed to obtain a perturbation image masked;
    classifying the perturbation image with a visualization processing model to obtain a classification result, and calculating the classification result to obtain an evaluation value of the perturbation image, wherein the evaluation value of the perturbation image is less than an evaluation value of the image to-be-processed without masking;
    determining the visualization evaluation result according to the evaluation value of the perturbation image; and
    sending the visualization evaluation result to the client.

2. The method of claim 1, wherein the masking comprises blurring, and masking the image to-be-processed to obtain the perturbation image masked comprises:
   determining a masking region set, wherein the masking region set comprises at least one masking region; and
   in the image to-be-processed, blurring respective masking regions in the masking region set to obtain the perturbation image, wherein the image to-be-processed comprises the respective masking regions in the masking region set.

3. The method of claim 1, further comprising: before classifying the perturbation image with the visualization processing model,
   obtaining a noise vector and a vector annotation, and processing the noise vector and the vector annotation with a deconvolution network to obtain a target image-annotation pair, the target image-annotation pair comprising a target generated image and a target generated image annotation;
   obtaining a first sample image and a second sample image-annotation pair, the second sample image-annotation pair comprising a second sample image and a sample image annotation;
   training the visualization processing model according to the target image-annotation pair, the first sample image, and the second sample image-annotation pair to obtain a model loss function; and
   constructing the visualization processing model according to the model loss function.

4. The method of claim 3, wherein the model loss function comprises a generation loss function, wherein the generation loss function is a loss function of a generator, and training the visualization processing model according to the target image-annotation pair, the first sample image, and the second sample image-annotation pair to obtain the model loss function comprises:
   discriminating the target image-annotation pair to generate a first discrimination result;
   determining a reconstruction loss according to the target generated image, the first sample image, and the second sample image; and
   determining the generation loss function of the generator according to the first discrimination result and the reconstruction loss.

5. The method of claim 3, wherein the model loss function comprises a classification loss function, wherein the classification loss function is a loss function of a classifier, and training the visualization processing model according to the target image-annotation pair, the first sample image, and the second sample image-annotation pair to obtain the model loss function comprises:
   classifying the first sample image to obtain a predicted annotation of the first sample image, and discriminating the first sample image and the predicted annotation to obtain a second discrimination result;
   performing supervised training on the target image-annotation pair and the second sample image-annotation pair to obtain a first cross entropy of the target image-annotation pair and a second cross entropy of the second sample image-annotation pair; and
   determining the classification loss function of the classifier according to the second discrimination result, the first cross entropy, and the second cross entropy.

6. The method of claim 3, wherein the model loss function comprises a discrimination loss function, where the discrimination loss function is a loss function of a discriminator, and training the visualization processing model according to the target image-annotation pair, the first sample image, and the second sample image-annotation pair to obtain the model loss function comprises:
   discriminating the target image-annotation pair to generate a third discrimination result;
   discriminating the first sample image and the predicted annotation to generate a fourth discrimination result;
   discriminating the second sample image-annotation pair to generate a fifth discrimination result; and
   determining the discrimination loss function of the discriminator according to the third discrimination result, the fourth discrimination result, and the fifth discrimination result.

7. The method of claim 3, wherein the model loss function comprises a generation loss function, a classification loss function, and a discrimination loss function, and constructing the visualization processing model according to the model loss function comprises:
   updating a parameter of a generator according to the generation loss function using a back propagation algorithm;
   updating a parameter of a classifier according to the classification loss function using a back propagation algorithm;
   updating a parameter of a discriminator according to the discrimination loss function using a back propagation algorithm; and
   constructing the visualization processing model according to the parameter of the generator, the parameter of the classifier, and the parameter of the discriminator.

8. A visualization processing apparatus for evaluating brain addiction traits, comprising a processor, a memory, and a communication interface connected with each other, wherein the memory is configured to store a computer program comprising program instructions, and the processor is configured to invoke the program instructions to:
   receive a visualization processing request from a client, wherein the visual processing request contains an image to-be-processed and is used for requesting a visualization evaluation result of the image to-be-processed;
   mask the image to-be-processed to obtain a perturbation image masked;
   classify the perturbation image with a visualization processing model to obtain a classification result, and calculating the classification result to obtain an evaluation value of the perturbation image, wherein the evaluation value of the perturbation image is less than an evaluation value of the image to-be-processed without masking;
   determine the visualization evaluation result according to the evaluation value of the perturbation image; and
   send the visualization evaluation result to the client.

9. The visualization processing apparatus of claim 8, wherein the masking comprises blurring, and the processor configured to invoke the program instructions to mask the image to-be-processed to obtain a perturbation image masked is configured to invoke the program instructions to:
   determine a masking region set, wherein the masking region set comprises at least one masking region; and
   in the image to-be-processed, blur respective masking regions in the masking region set to obtain the perturbation image, wherein the image to-be-processed comprises the respective masking regions in the masking region set.

10. The visualization processing apparatus of claim 8, the processor is further configured to invoke the program instructions to:
  obtain a noise vector and a vector annotation, and process the noise vector and the vector annotation with a deconvolution network to obtain a target image-annotation pair, the target image-annotation pair comprising a target generated image and a target generated image annotation;
  obtain a first sample image and a second sample image-annotation pair, the second sample image-annotation pair comprising a second sample image and a sample image annotation;
  train the visualization processing model according to the target image-annotation pair, the first sample image, and the second sample image-annotation pair to obtain a model loss function; and
  construct the visualization processing model according to the model loss function.

11. The visualization processing apparatus of claim 10, wherein the model loss function comprises a generation loss function, wherein the generation loss function is a loss function of a generator, and the processor configured to invoke the program instructions to train the visualization processing model according to the target image-annotation pair, the first sample image, and the second sample image-annotation pair to obtain the model loss function is configured to invoke the program instructions to:
  discriminate the target image-annotation pair to generate a first discrimination result;
  determine a reconstruction loss according to the target generated image, the first sample image, and the second sample image; and
  determine the generation loss function of the generator according to the first discrimination result and the reconstruction loss.

12. The visualization processing apparatus of claim 10, wherein the model loss function comprises a classification loss function, wherein the classification loss function is a loss function of a classifier, and the processor configured to invoke the program instructions to train the visualization processing model according to the target image-annotation pair, the first sample image, and the second sample image-annotation pair to obtain the model loss function is configured to invoke the program instructions to:
  classify the first sample image to obtain a predicted annotation of the first sample image, and discriminating the first sample image and the predicted annotation to obtain a second discrimination result;
  perform supervised training on the target image-annotation pair and the second sample image-annotation pair to obtain a first cross entropy of the target image-annotation pair and a second cross entropy of the second sample image-annotation pair; and
  determine the classification loss function of the classifier according to the second discrimination result, the first cross entropy, and the second cross entropy.

13. The visualization processing apparatus of claim 10, wherein the model loss function comprises a discrimination loss function, where the discrimination loss function is a loss function of a discriminator, and the processor configured to invoke the program instructions to train the visualization processing model according to the target image-annotation pair, the first sample image, and the second sample image-annotation pair to obtain the model loss function is configured to invoke the program instructions to:
  discriminate the target image-annotation pair to generate a third discrimination result;
  discriminate the first sample image and the predicted annotation to generate a fourth discrimination result;
  discriminate the second sample image-annotation pair to generate a fifth discrimination result; and
  determine the discrimination loss function of the discriminator according to the third discrimination result, the fourth discrimination result, and the fifth discrimination result.

14. The visualization processing apparatus of claim 10, wherein the model loss function comprises a generation loss function, a classification loss function, and a discrimination loss function, and the processor configured to invoke the program instructions to construct the visualization processing model according to the model loss function is configured to invoke the program instructions to:
  update a parameter of a generator according to the generation loss function using a back propagation algorithm;
  update a parameter of a classifier according to the classification loss function using a back propagation algorithm;
  update a parameter of a discriminator according to the discrimination loss function using a back propagation algorithm; and
  construct the visualization processing model according to the parameter of the generator, the parameter of the classifier, and the parameter of the discriminator.

15. A non-transitory computer-readable storage medium storing one or more instructions, wherein the one or more instructions are adapted to be loaded by a processor to:
  receive a visualization processing request from a client, wherein the visual processing request contains an image to-be-processed and is used for requesting a visualization evaluation result of the image to-be-processed;
  mask the image to-be-processed to obtain a perturbation image masked;
  classify the perturbation image with a visualization processing model to obtain a classification result, and calculating the classification result to obtain an evaluation value of the perturbation image, wherein the evaluation value of the perturbation image is less than an evaluation value of the image to-be-processed without masking;
  determine the visualization evaluation result according to the evaluation value of the perturbation image; and
  send the visualization evaluation result to the client.

16. The non-transitory computer-readable storage medium of claim 15, wherein the masking comprises blurring, and the one or more instructions adapted to be loaded by the processor to mask the image to-be-processed to obtain a perturbation image masked are adapted to be loaded by the processor to:
  determine a masking region set, wherein the masking region set comprises at least one masking region; and
  in the image to-be-processed, blur respective masking regions in the masking region set to obtain the perturbation image, wherein the image to-be-processed comprises the respective masking regions in the masking region set.

17. The non-transitory computer-readable storage medium of claim 15, wherein the one or more instructions are further adapted to be loaded by the processor to:
  obtain a noise vector and a vector annotation, and process the noise vector and the vector annotation with a deconvolution network to obtain a target image-annotation pair, the target image-annotation pair comprising a target generated image and a target generated image annotation;

obtain a first sample image and a second sample image-annotation pair, the second sample image-annotation pair comprising a second sample image and a sample image annotation;

train the visualization processing model according to the target image-annotation pair, the first sample image, and the second sample image-annotation pair to obtain a model loss function; and construct the visualization processing model according to the model loss function.

18. The non-transitory computer-readable storage medium of claim 17, wherein the model loss function comprises a generation loss function, wherein the generation loss function is a loss function of a generator, and the one or more instructions adapted to be loaded by the processor to train the visualization processing model according to the target image-annotation pair, the first sample image, and the second sample image-annotation pair to obtain the model loss function are adapted to be loaded by the processor to:

discriminate the target image-annotation pair to generate a first discrimination result;

determine a reconstruction loss according to the target generated image, the first sample image, and the second sample image; and determine the generation loss function of the generator according to the first discrimination result and the reconstruction loss.

19. The non-transitory computer-readable storage medium of claim 17, wherein the model loss function comprises a classification loss function, wherein the classification loss function is a loss function of a classifier, and the one or more instructions adapted to be loaded by the processor to train the visualization processing model according to the target image-annotation pair, the first sample image, and the second sample image-annotation pair to obtain the model loss function are adapted to be loaded by the processor to:

classify the first sample image to obtain a predicted annotation of the first sample image, and discriminating the first sample image and the predicted annotation to obtain a second discrimination result;

perform supervised training on the target image-annotation pair and the second sample image-annotation pair to obtain a first cross entropy of the target image-annotation pair and a second cross entropy of the second sample image-annotation pair; and determine the classification loss function of the classifier according to the second discrimination result, the first cross entropy, and the second cross entropy.

20. The non-transitory computer-readable storage medium of claim 17, wherein the model loss function comprises a discrimination loss function, where the discrimination loss function is a loss function of a discriminator, and the one or more instructions adapted to be loaded by the processor to train the visualization processing model according to the target image-annotation pair, the first sample image, and the second sample image-annotation pair to obtain the model loss function are adapted to be loaded by the processor to:

discriminate the target image-annotation pair to generate a third discrimination result;

discriminate the first sample image and the predicted annotation to generate a fourth discrimination result;

discriminate the second sample image-annotation pair to generate a fifth discrimination result; and determine the discrimination loss function of the discriminator according to the third discrimination result, the fourth discrimination result, and the fifth discrimination result.

\* \* \* \* \*